July 29, 1924.
E. A. CHASE
1,503,026
GRANITE WORKING TOOL
Original Filed Feb. 11, 1921
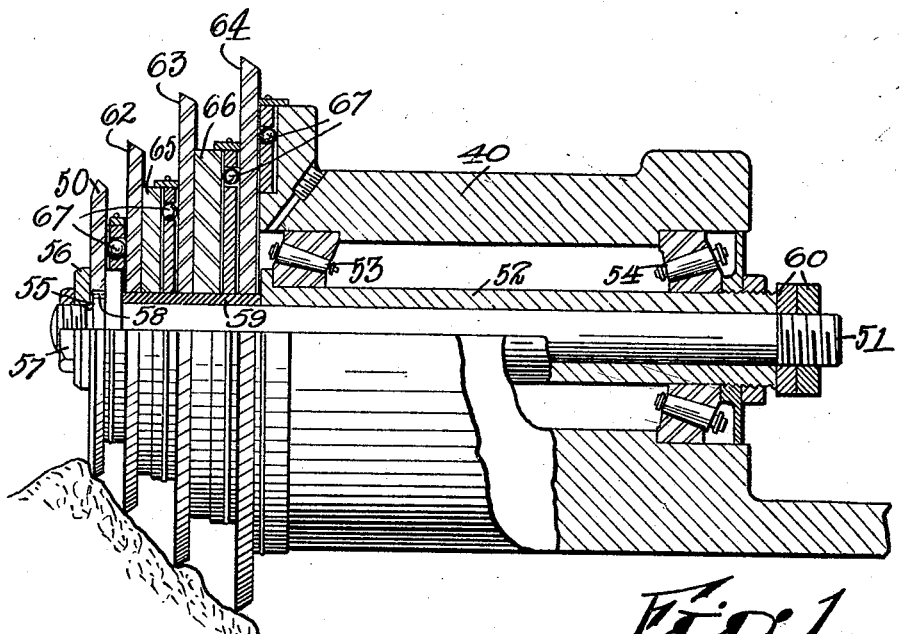
Fig. 1.
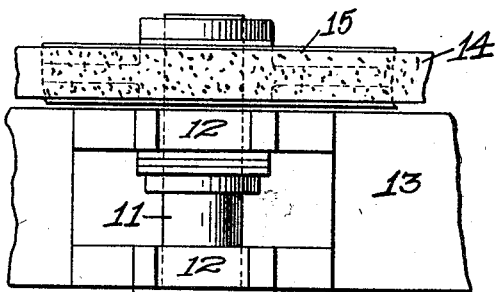
Fig. 2.
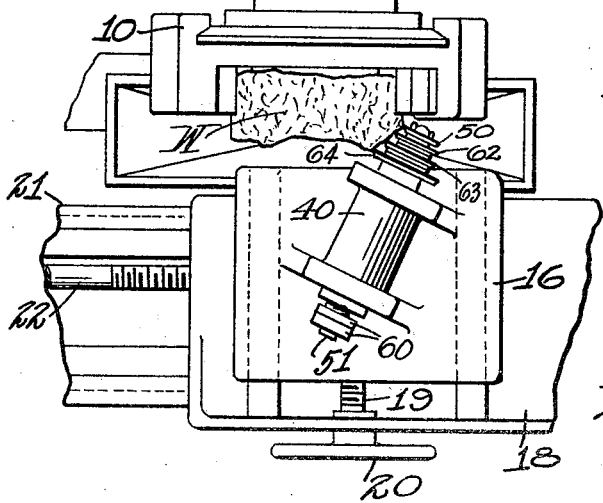
Inventor:
Elroy A. Chase
By Southgate & Southgate
Attorneys Patented July 29, 1924.

1,503,026

UNITED STATES PATENT OFFICE.

ELROY ALBERT CHASE, OF NORTHFIELD, VERMONT.

GRANITE-WORKING TOOL.

Original application filed February 11, 1921, Serial No. 444,221. Divided and this application filed May 29, 1923. Serial No. 642,363.

*To all whom it may concern:*

Be it known that I, ELROY A. CHASE, a citizen of the United States, residing at Northfield, in the county of Washington and State of Vermont, have invented a new and useful Granite-Working Tool, of which the following is a specification.

This application is a division of my application Serial No. 444,221, filed February 11, 1921, on a granite working machine. This invention relates particularly to an improved tool for removing stock from the surface of large blocks of granite or other similar material, and for quickly and economically producing a relatively smooth surface thereon.

It is well understood in the art of stone finishing that granite cannot be successfully subjected to the action of cutting tools but that surplus material must be removed by a crushing or breaking process in which there is no substantial sliding movement between the work and the tool. In this respect, the finishing of granite is quite different from the finishing of marble or other soft stones.

Accordingly, my invention consists particularly in the provision of an improved and novel granite working tool so constructed that it will act by a crushing or breaking action rather than by cutting the stone.

To utilize the advantages of my improved tool, provision must be made for relative movement between the tool and the work and this result may be conveniently attained by mounting the stone in a chuck for rotation in a large and heavy type of lathe.

In the form of my invention herein shown, I provide a tool comprising a plurality of discs having bevelled edges and mounted for free and independent rotation upon a movable tool carriage or table. The discs are progressively increased in size rearwardly from the face of the stone and the spaces between the discs are also preferably progressively increased, providing greater clearance for the larger pieces of stone which are removed by the larger rear or outer discs.

A further feature of my invention pertains to the provision of improved bearings for the discs, adapted to resist the severe strains to which the discs are subjected when in operation.

My invention is fully shown in the drawings in which—

Fig. 1 is a side elevation, partly in section, of my improved granite working tool; and Fig. 2 is a plan view of a portion of a machine in which the tool shown in Fig. 1 may be utilized.

Referring first to Fig. 2, I will describe the general features of the granite working machine therein shown and for which my improved tool is well adapted.

I have shown a block of granite W firmly secured in a chuck 10 mounted on the end of a heavy shaft 11 rotatable in bearings 12 on a frame or base 13. The shaft 11 may be rotated in any convenient manner as by a belt 14 running over a pulley 15 on the shaft 11. A tool carriage 16 is mounted to slide axially of the shaft 11 on a table 18 and may be adjusted thereon by a screw 19 and hand wheel 20. The table 18 is movable on guides 21 by a screw 22 which may be rotated manually or automatically in any suitable manner.

The tool carriage 16 is provided with a bearing casing 40 in which a supporting shaft 51 is rotatably mounted. The axis of the shaft 51 is preferably disposed at an angle to the shaft 11, as clearly indicated in Fig. 2.

A relatively small double-bevel disc 50 is mounted on a shoulder 55 of the shaft 51 and is held against a flange 56 on said shaft by a clamping nut 57. A key 58 may be added to prevent relative rotation of the disc and shaft. A bushing 59 and bearing sleeve 52 are clamped on the shaft 51 by lock nuts 60 and the entire assembly is rotatably supported in a pair of antifriction thrust bearings 53 and 54 within the bearing casing 40.

Additional discs 62, 63 and 64 are mounted on the bushing 59 and the discs 62 and 63 are provided with spacing plates 65 and 66. Ball bearings 67 are introduced between adjacent surfaces of the discs and spacing plates and also at the rear of the outer disc 64.

The bushing 58 is commonly a short section of ordinary pipe or tubing which is of relatively soft material and upon which the hardened steel discs 62, 63 and 64 will rotate with very little wear. The bushing 58 may be very easily and cheaply replaced, thus greatly reducing the cost of up-keep.

The provision of anti-friction bearings between the edge portions of the discs is of great importance, as it permits the discs to rotate freely under all circumstances, no matter how great pressure they may sustain. The edges of the discs would be very quickly destroyed by any relative sliding movement between the discs and the extremely hard surface of the granite and consequently this provision for insuring free rotation of the discs under all conditions is very essential.

The action of the several discs is clearly shown in Figs. 1 and 2, from which it appears that the outer disc 64 commonly engages the stock first, removing the portions projecting beyond its cutting plane in relatively large pieces. The other discs 63, 62 and 50 thereafter successively engage the stone and remove layers of decreasing thickness from the face thereof. The disc 50 removes a relatively thin layer only and leaves a comparatively smooth surface for succeeding finishing operations.

My improved tool in one passage over the surface of the block thus removes several successive layers of material, enabling me to dress off the face of a block of granite with a very great reduction in both time and labor.

Having thus described my invention and the advantages thereof, I do not wish to be limited to the details herein disclosed otherwise than as set forth in the claims, but what I claim is:

1. A granite working tool comprising a shaft, a supporting bearing in which said shaft is rotatably mounted, a work engaging disc mounted in fixed angular relation on said shaft, and additional discs mounted for free and independent rotation of said shaft.

2. A granite working tool comprising a shaft, a supporting bearing in which said shaft is rotatable, a work engaging disc fixed to the end of said shaft, a plurality of discs freely rotatable on said shaft, and anti-friction devices effective to resist side thrust on said discs.

3. A granite working tool comprising a shaft, a supporting bearing in which said shaft is rotatably mounted, a work engaging disc mounted in fixed angular relation on said shaft, a bushing on said shaft, additional discs freely and independently rotatable on said bushing, and means to secure said bushing on said shaft.

4. A granite working tool comprising a shaft having a flange near one end thereof, a work engaging disc, means to clamp said disc against one side of said flange, a bushing, means to clamp said bushing against the opposite side of said flange, and additional discs freely and independently rotatable on said bushing.

5. A granite working tool comprising a shaft having a flange at one end thereof, a work engaging disc, means to clamp said disc against one side of said flange, a bushing, means to clamp said bushing against the opposite side of said flange, additional discs freely and independently rotatable on said bushing, and anti-friction devices effective to resist side thrust on said discs.

6. A granite working tool comprising a shaft, a supporting bearing casing in which said shaft is rotatably mounted, a work engaging disc mounted in fixed angular relation on said shaft, a bushing on said shaft, additional discs freely and independently rotatable on said bushing, a bearing sleeve on said shaft, means to secure said bushing and said sleeve on said shaft, and anti-friction thrust bearing elements between said supporting casing and said bearing sleeve.

In testimony whereof I have hereunto affixed my signature.

ELROY ALBERT CHASE.